United States Patent [19]

Louison

[11] Patent Number: 5,462,018
[45] Date of Patent: Oct. 31, 1995

[54] BRUSHING DEVICE FOR GROOMING ANIMALS

[75] Inventor: Bernard Louison, Chavanay, France

[73] Assignee: SEB S.A., Selongey Cedex, France

[21] Appl. No.: 158,738

[22] Filed: Nov. 30, 1993

[30] Foreign Application Priority Data

Nov. 30, 1992 [FR] France ................... 92 14603

[51] Int. Cl.⁶ ................................ A01K 13/00
[52] U.S. Cl. ............................................. 119/86
[58] Field of Search ................... 119/83, 86, 88, 119/85; 15/344, 184

[56] References Cited

U.S. PATENT DOCUMENTS

| | | | |
|---|---|---|---|
| 1,786,384 | 12/1930 | Amstutz | 15/344 |
| 4,799,460 | 1/1989 | Kuhl | 15/344 |
| 4,977,909 | 12/1990 | Chou | 15/184 X |
| 5,115,765 | 5/1992 | El Omary | 119/83 |
| 5,267,528 | 12/1993 | Murieen, Sr. | 119/83 X |

Primary Examiner—Gene Mancene
Assistant Examiner—Thomas Price
Attorney, Agent, or Firm—Spensley Horn Jubas & Lubitz

[57] ABSTRACT

A manually operable grooming device for animal coats, the device including: a main body; a scratching unit carried by the main body and including a support member and a plurality of scratching teeth carried by, and extending from, the support member, the scratching teeth having free ends which define a scratching surface; a removable screen penetrated by at least a portion of the scratching teeth for recovering animal fur from between the scratching teeth; and a suction unit mounted in the main body behind the scratching surface for producing an air flow along a path adjacent the scratching unit and in a direction from the scratching surface toward the support member, wherein the screen extends across a surface which is spaced from the scratching surface and includes an annular portion which surrounds the scratching teeth, is free of teeth, and is in the path of the air flow.

21 Claims, 3 Drawing Sheets

BRUSHING DEVICE FOR GROOMING ANIMALS

BACKGROUND OF THE INVENTION

The present invention relates to devices and utensils for cleaning and grooming the fur, or coat, of an animal, in particular for domestic animals, such as dogs or cats for example.

The invention is directed to a brushing device which is used manually and has a main body provided with a series of brushing teeth which extend through openings in a removable grill, or screen, for recovering fur.

Owners of domestic animals, and particularly animals of the canine species, are regularly confronted with the problem of cleaning the fur of their pet, as well as the problem of neatly collecting the loose fur so that it is not scattered about.

As a solution to these problems, it has already been proposed to provide a brushing device for manual use provided with a series of brushing teeth defining a brushing surface. A removable grid, grill, or screen for recovering loose fur is threaded around the teeth, generally over the entire height of the teeth. The brushing teeth are fixed to a support with the possibility of sliding along the main axis of the brushing teeth in a manner to be able to free the grill which is removably mounted on the main body of the brushing device. With such a device, the user, after having brushed the animal, proceeds to release the support of the brushing teeth, in general by a rotational movement. Then, the user proceeds to retract the teeth by axial sliding, which has for its effect to free the grill from the teeth. The fur, or hair, which has been recovered and which has been caught up in the teeth is then freely accessible on the grill which is free of teeth. The user can then easily recover the fur which is evacuated during brushing, since it rests on the grill. After having reinserted the grill, a new brushing cycle can be effectuated.

Such a device fulfills the first function for which it has been conceived, which is brushing of the fur and recovery of loose fur. Such a device cannot, however, be considered as completely fulfilling the function which is normally assigned to it. In effect, during passage of the brush through the animal's fur the teeth situated at the periphery of the brushing surface perform a mechanical action-of removal, toward the surface, of a certain number of loose hairs. These hairs which have been broken off and brought to the surface of the coat are then freed and can be scattered in the immediate vicinity of the animal. The known and widely used devices for brushing according to this technique are thus not able to recover the totality of the loose hair, or fur, carried by the animal. This drawback constantly results in a generalized deposit of fur throughout the environment normally occupied by the animal. Such deposits are obviously to be avoided, all the more so since loose hairs are generally covered at least partially with a greasy film promoting their adhesion to all types of surfaces.

Another known type of device, as disclosed for example in French application A2595539, is intended to clean the coat of an animal and is adapted to be connected to a suction source, or vacuum cleaner. The apparatus includes a connection defining a suction chamber at the interior of which are disposed a comb, a brush and a pulverizing device. The level of noise generated by such an apparatus makes it difficult to use for a large number of animals who, to the extent that they will tolerate it, are nevertheless made nervous by the noise. The cleaning operation then becomes difficult and is, in general, ineffective. Moreover, the relative locations of the comb, the brush and the suction flow lead to an insufficient recovery and suction of the loose fur, a certain proportion of which is deposited in the region immediately surrounding the animal.

SUMMARY OF THE INVENTION

It is an object of the present invention to eliminate, or at least reduce, the above-mentioned drawbacks and difficulties and to provide a brushing device which is manually operable and which promotes an accumulation of loose fur, or hair, at the level of the brushing teeth and prevents a projection and exterior scattering of the loose hair situated in the vicinity of the brushing zone.

A complementary object of the invention is to furnish a brushing device which improves the brushing operating while minimizing tangling of the loose fur.

Another object of the invention is to provide a brushing device which is quiet in operation and will thus be tolerated and accepted by animals, and capable of speedily grooming an animal's coat.

The above and other objects are achieved according to the invention by a manually operable grooming device for animal coats, the device comprising: a main body; scratching means carried by the main body and comprising a support member and a plurality of scratching teeth carried by, and extending from, the support member, the scratching teeth having free ends which define a scratching surface; a removable screen penetrated by at least a portion of the scratching teeth for recovering animal fur from between the scratching teeth; and suction means mounted in the main body behind the scratching surface for producing an air flow along a path adjacent the scratching means and in a direction from the scratching surface toward the support member, wherein the screen extends across a surface which is spaced from the scratching surface and includes an annular portion which surrounds the scratching teeth, is free of teeth, and is in the path of the air flow.

BRIEF DESCRIPTION OF THE DRAWING

Characteristics and advantages of the invention will become more readily apparent from a reading of the specification given herebelow, by way of nonlimiting example, with reference to the attached drawings in which.

DESCRIPTION OF THE PREFERRED EMBODIMENTS

Figure 1:
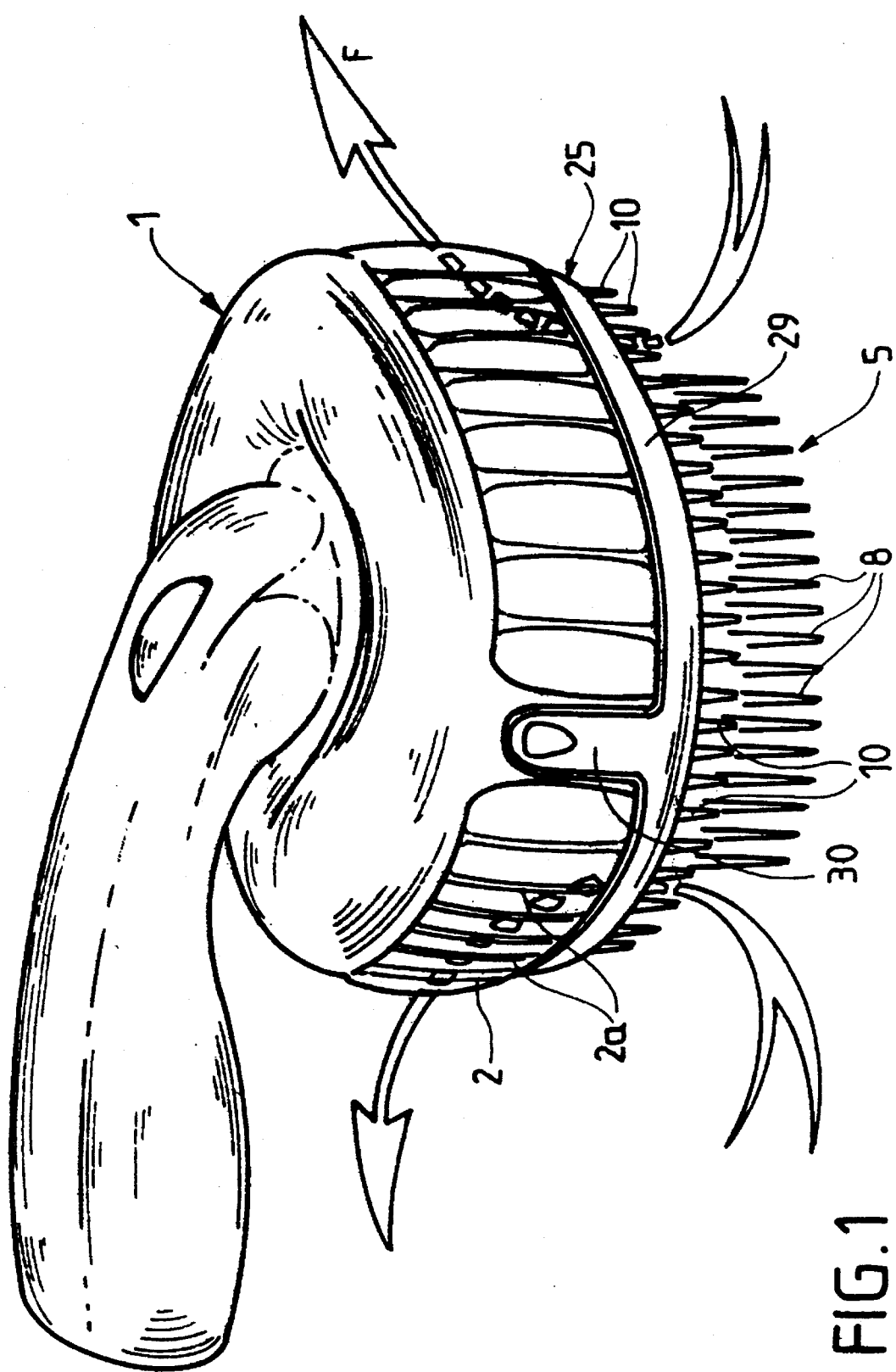
FIG. 1 is a perspective view showing an embodiment of a brushing device according to the invention.
Figure 2:
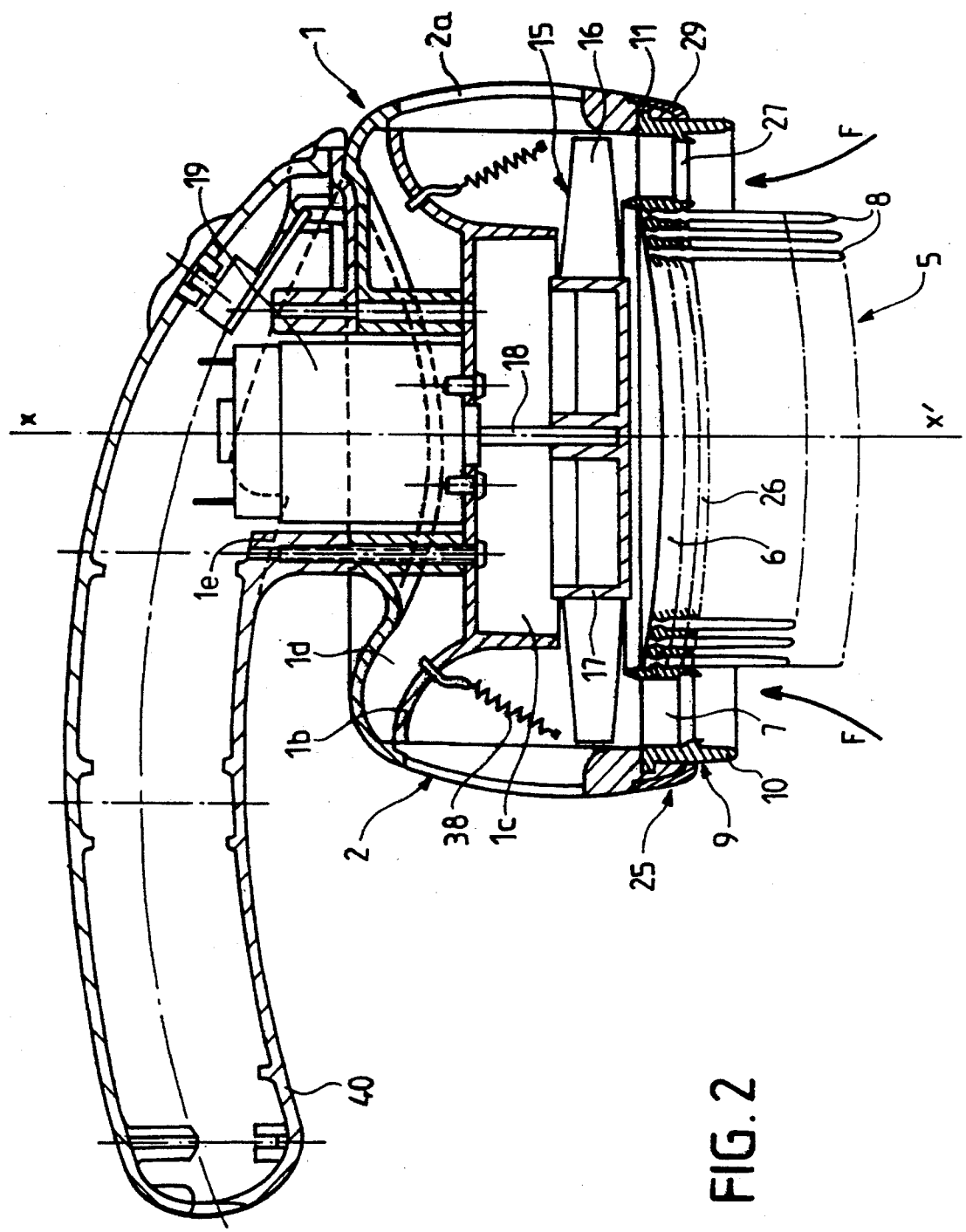
FIG. 2 is a cross-sectional view of the embodiment of FIG. 1.
Figure 3:
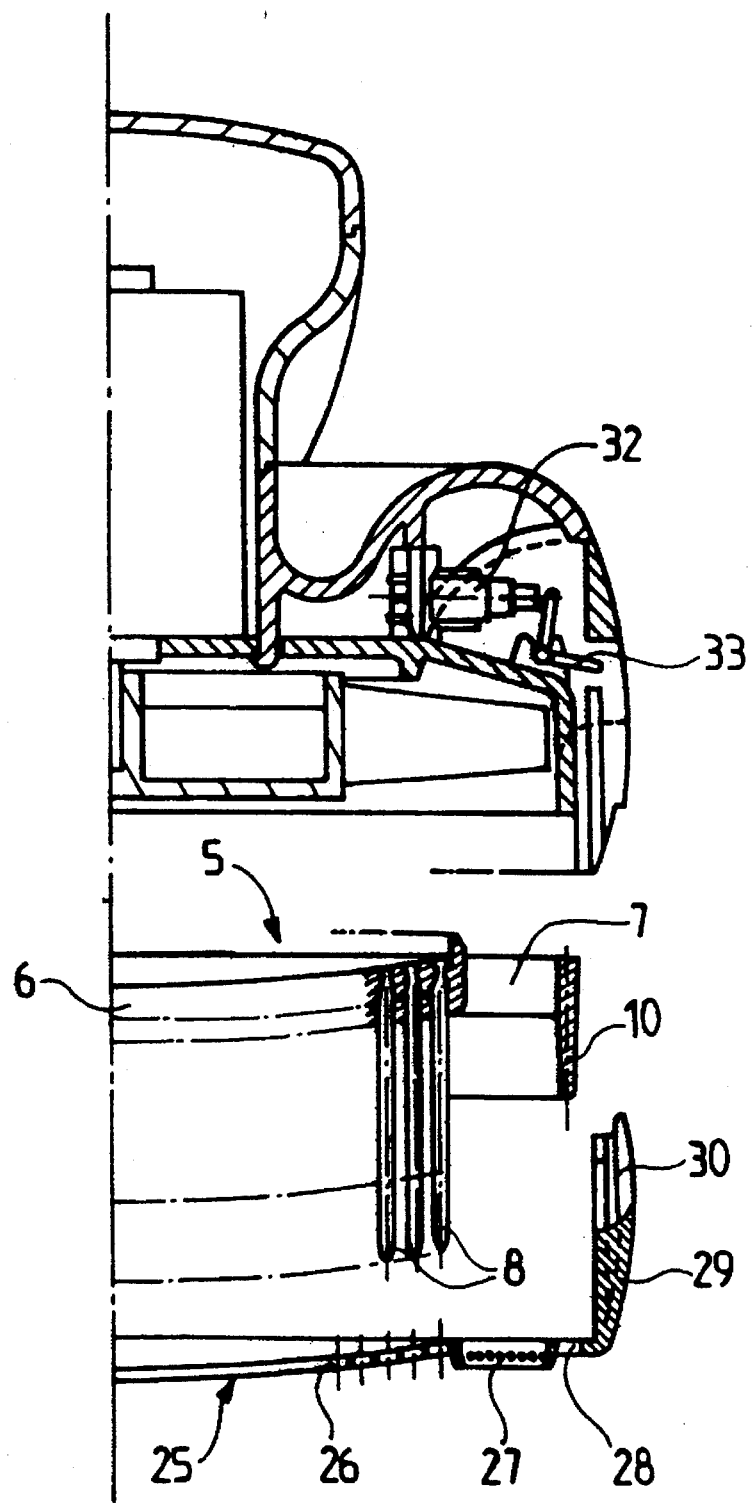
FIG. 3 is a cross-sectional detail view of a portion of the embodiment of FIG. 1, to the right of axis x–x' of FIG. 2, better illustrating the nesting of various parts in one another.

The manual brushing device according to the invention such as shown in FIGS. 1, 2 and 3 includes a main body 1 constituted for example by an envelope in the form of a shell defining a volume of revolution around an axis x–x' shown in FIG. 2 In the preferred embodiment shown in FIGS. 1–3, main body 1 is closed at its upper part and includes a side envelope 2 which bulges slightly toward the exterior. Envelope 2 is provided with fins 2a defining openings for ejecting air, fins 2a preferably being inclined, thus placing the region enclosed by main body 1 in communication with the exterior. Main body 1 is provided at its interior with an internal volute 1b serving as an internal partition, or wall, of main body 1 in a manner to define a lower volume, or lower space, 1c and an upper volume, or upper space, 1d. Main body 1 can be made of any suitable materials, and in particular plastic materials.

Lower space 1c is closed by a currycomb brush 5 having a central portion constituted by a support member forming a smooth, imperforate wall, such as a disk 6. The smooth wall is provided at its periphery with a series of radial arms 7. Disk 6 serves to support a series of scratching, or brushing, teeth 8 inserted and fixed for example in the body of disk 6 and standing vertically from disk 6. Teeth 8 may be arranged uniformly or not, and are preferably perpendicular to the external face of disk 6. Teeth 8 are preferably metallic and all preferably of identical length. This length may be varied over a certain range. FIG. 2 shows two possible lengths for teeth 8, an embodiment in which teeth 8 have a first length being shown to the left of axis x–x' and an embodiment in which teeth 8 have a second length, greater than the first length, being shown to the right of axis X–X'.

Advantageously, disk 6 presents, in order to facilitate scratching, a regular characteristic curvature which is concave toward lower space 1c. In an advantageous manner, teeth 8 cover the surface of disk 6 in a substantially regular pattern and thus define, by their free ends, a scratching surface substantially parallel to the surface of disk 6. The scratching teeth 8 can also be made of a plastic material, for example.

Teeth 8 can have a cross section which is circular, ovoid, triangular or square depending on the type of functions which it must perform. A triangular or square cross section is for example particularly advisable for untangling fur. Teeth 8 are implanted, and maintained, in disk 6 by any known means, and for example by being molded into disk 6. It is also possible to modify the shape of the free ends of teeth 8, giving them for example a frustoconic or even spherical form. In the latter case, the active length of a tooth 8 can reach a value of three times its base diameter. Advantageously, teeth 8 can be coated with any material facilitating sliding of the teeth through the animal's coat and reducing wear of the teeth.

The currycomb brush 5 is completed by a peripheral annular piece 9 fixed to the outer ends of radial arms 7 and in which have been cut a series of combing teeth 10. Advantageously, combing teeth 10 form a peripheral row of teeth completely enclosing teeth 8. In order to prevent a negative action between teeth 8 and combing teeth 10 during passage of the teeth through the animal's coat, it is desirable to provide, such as shown in FIGS. 1–3, for the combing teeth 10 to be supported at substantially the same plane as teeth 8, which plane is perpendicular to the axis of rotation of the rotating parts, but to extend for a vertical distance which is equal to or less than that of teeth 8. Annular peripheral piece 9 can be fabricated during molding of the assembly of currycomb brush 5 and can be constituted for example of a plastic material based on a polyamide filled with glass fibers in an amount of 20–30%. Currycomb brush 5 is fixed in a removable manner to principal body 1 with the aid of any known latching means, and for example with the aid of a bayonet latching system. For this purpose, fixation ribs 11 can be provided at the periphery and in the upper part of annular piece 9.

The brushing device according to the invention includes a suction, or aspiration, means 15 preferably mounted in the lower space 1c of main body 1, behind disk 6. Suction means 15 is constituted for example by a shaped helix having blades 16 which extend, at least in part, in line with radial arms 7. Suction means 15 is fixed to a hub 17 which is keyed to a drive axis 18 that is coupled to a source 19 of rotational movement, such as an electric motor. Motor 19 is mounted and maintained in place in any known manner at the interior of a compartment delimited by part 1e of body 1. Motor 19 extends at least partly into upper space 1d of main body 1. In a manner known per se, motor 19 is connected by connection wires (not shown) to an electrical energy source which can be power mains, batteries, etc.

Blades 16 extend radially outwardly from hub 17 above the peripheral annular space situated adjacent radial arms 7 in a manner to sweep preferably the totality of the annular space during rotation of suction means 15. This creates a suction flow F which is strongly augmented and can even be accentuated by shaping the walls of internal volute 1b to create a peripheral suction pathway.

The brushing device according to the invention also includes a recovery grill, grid, or screen 25 with a mesh adapted to be threaded and mounted in a removable manner on the brushing teeth 8 in order to assure recovery of the loose animal fur. Recovery grill 25 is fabricated, for example, from a metallic material and extends across a surface which is above the brushing surface defined by brushing teeth 8, in a manner to completely cover the peripheral annular space located adjacent radial arms 7. In the embodiment shown in FIGS. 1–3, recovery grill 25 is circular and has a perforated central zone 26, intended to be fitted around teeth 8. Grill 25 further has an annular portion 27 constructed to cover the entirety of the annular space located below and adjacent arms 7. The external edge of recovery grill 25 is constituted by a peripheral row of openings 28 provided to fit around comb teeth 10, and by an edge 29 intended to come to bear against the lower part of main body 1.

Fixation of recovery grill 25 on main body 1 can be assured by at least two fingers 30 preferably disposed symmetrically with respect to axis x–x', and assuring a latching of the grill. Advantageously, fingers 30 also take on the function of pre-centering the recovery grill during its installation in mating openings provided in main body 1. Fingers 30 are provided with any suitable known latching means which permits latching with complementary latching means provided in main body 1. Optionally, as shown in FIG. 3, main body 1 can be provided with an electric switch, e.g. a microswitch, 32 in contact with a pivot lever 33 which is actuated by one of the fingers 30 during installation of recovery grill 25 on main body 1. Switch 32 is connected in series with one of the wires supplying current to motor 19 and thus assures that the device will not operate unless grill 25 is properly installed on main body 1.

The brushing device according to the invention is completed by a handle 40 constructed as an extension of main body 1.

The operation of the brushing device shown in FIG. 1–3 will now be described.

After having placed suction means 15 into operation, for example by depressing a button, the user holds the brushing device by the handle 40 and then applies the device against the coat of an animal. During the course of passage of teeth 8 against the coat of the animal, loose hairs pushed by teeth 8 away from the brushing surface are aspirated at the periphery of the brushing surface by the suction flux F created by the rotation of blades 16 and passing through annular portion 27, which is also provided with perforations. The hairs, or fur, which are not exposed to the action of the suction flow but undergo the effect of teeth 8 are simultaneously pressed against grill 25 and accumulate progressively between teeth 8 over the entire brushing surface. During the course of a brushing operation, the hairs which have not been retained, or have not been sufficiently retained, by teeth 8 are evacuated toward the periphery of the brushing surface and aspirated and pressed against the recovery grill 25 at the level of the annular portion 27. There is thus no risk of dispersion of hairs, or fur, toward the outside. Simultaneously with the brushing action, the part of the animal's coat which is liberated from the action of the scratching teeth is subjected to the action of the combing teeth, which simply assures a desirable arrangement of the fur and the imparting of a surface luster thereto.

It is equally possible to provide, as shown in FIG. 2, heating resistances 38 mounted in the interior space of main body 1. Heating resistances 38 are advantageously mounted in the path of upward movement of the suction flow F in line with annular portion 27. As shown in FIG. 2, heating resistances 38 are disposed above suction means 15. The operation of a brushing device including heating resistances 38 requires the direction of rotation of the suction means 15 be reversible so that the rotation of blades 16 will then assure the delivery of hot air in a downward direction through the annular portion 27 and toward an animal's coat. For this application, the user can, immediately after bathing the animal, utilize the device according to the invention not only to assure removal of loose hairs, as well as creation of a shiny coat, but also in a manner which implies a heating in order to achieve rapid drying of the coat.

In all of the embodiments described above, the user cleans the device by extracting recovery grill 25 from currycomb brush 5. During the course of this extraction, grill 5 assures, by axial sliding on the teeth 8 and on the comb teeth 10, recovery of hairs tangled in those teeth. The user then only has to collect the hairs present on recovery grill 25 and then after replacement of grill 25, a new brushing cycle can begin.

The brushing device according to the invention presents the advantage of avoiding spreading of loose hairs into the region surrounding the animal, to the extent that hairs which are not fixed by the teeth 8 are directed toward the periphery of the brushing surface where they are aspirated and pressed against annular portion 27. There is thus no longer, as in the systems of the prior art, any scattering of non-retained loose hairs. In addition, the suction flow F is concentrated peripherally on a limited surface which contributes to creating an optimal aspiration flux.

This application relates to subject matter disclosed in French Application number 9214603, filed on Nov. 30, 1992, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. Manually operable grooming device for animal coats, said device comprising:

a main body;

scratching means for scratching an animal's coat carried by said main body and comprising a support member and a plurality of scratching teeth carried by, and extending from, said support member, said scratching teeth having free ends which define a scratching surface;

a removable screen penetrated by at least a portion of said scratching teeth for recovering animal fur from between said scratching teeth; and suction means mounted in said main body behind said scratching surface for producing an air flow along a path adjacent said scratching means and in a direction from said scratching surface toward said support member, wherein said screen extends across a surface which is spaced from said scratching surface and includes an annular portion which surrounds said scratching teeth, is free of teeth, and is in the path of the air flow.

2. A device as defined in claim 1 wherein said scratching surface has a periphery and said annular portion of said screen extends entirely around the periphery of said scratching surface.

3. A device as defined in claim 2 wherein said support member is constituted by an imperforate wall which is impermeable to air flow.

4. A device as defined in claim 3 wherein said imperforate wall is curved.

5. A device as defined in claim 1 wherein said support member is constituted by an imperforate wall which is impermeable to air flow.

6. A device as defined in claim 5 wherein said imperforate wall is curved.

7. A device as defined in claim 1 further comprising means providing a plurality of comb teeth disposed to surround said annular portion of said screen.

8. A device as defined in claim 7 wherein said comb teeth extend parallel to said scratching teeth and have a length smaller than that of said scratching teeth.

9. A device as defined in claim 8 wherein said comb teeth form a peripheral row of teeth completely surrounding said annular portion of said screen.

10. A device as defined in claim 9 wherein said means providing a plurality of comb teeth comprise an annular piece which carries said comb teeth, and said device further comprises a plurality of arms extending between said annular piece and said support member for immovably securing said annular piece to said support member.

11. A device as defined in claim 8 wherein said means providing a plurality of comb teeth comprise an annular piece which carries said comb teeth, and said device further comprises a plurality of arms extending between said annular piece and said support member for immovably securing said annular piece to said support member.

12. A device as defined in claim 7 wherein said means providing a plurality of comb teeth comprise an annular piece which carries said comb teeth, and said device further comprises a plurality of arms extending between said annular piece and said support member for immovably securing said annular piece to said support member.

13. A device as defined in claim 7 wherein said screen is removably attached to said main body.

14. A device as defined in claim 13 wherein said screen comprises at least two precentering fingers provided with fastening means for engagement with complementary fastening means provided in said main body.

15. A device as defined in claim 1 wherein said screen is removably attached to said main body.

16. A device as defined in claim 15 wherein said screen comprises at least two precentering fingers provided with fastening means for engagement with complementary fastening means provided in said main body.

17. A device as defined in claim 1 further comprising resistance heating means mounted in said main body and located in the path of the air flow.

18. A device as defined in claim 17 wherein said resistance heating means are disposed in line with said annular portion of said screen.

19. A device as defined in claim 1 wherein said suction means comprise fan means rotatably mounted in said main body, and drive means mounted in said main body and coupled to said fan means for rotating said fan means.

20. A device as defined in claim 1 wherein said annular portion of said screen is provided with perforations defining a portion of the path of the air flow.

21. A device as defined in claim 20 wherein said main body has a side envelope which surrounds said suction means, said side envelope having openings through which the path of the air flow extends.

* * * * *